US006449179B1

(12) United States Patent
Reichard

(10) Patent No.: US 6,449,179 B1
(45) Date of Patent: Sep. 10, 2002

(54) MULTI-LEVEL QUASI-RESONANT POWER INVERTER

(75) Inventor: Jeffrey A. Reichard, Oconomowoc, WI (US)

(73) Assignee: American Superconductor Corp., Westborough, MA (US)

( * ) Notice: Subject to any disclaimer, the term of this patent is extended or adjusted under 35 U.S.C. 154(b) by 0 days.

(21) Appl. No.: 09/870,401

(22) Filed: May 30, 2001

Related U.S. Application Data

(63) Continuation of application No. 09/818,235, filed on Mar. 26, 2001, which is a continuation-in-part of application No. 09/705,158, filed on Nov. 2, 2000.

(51) Int. Cl.$^7$ .............................................. H02M 7/537
(52) U.S. Cl. ...................................................... 363/131
(58) Field of Search ................................ 363/131, 132, 363/133, 134, 135

(56) References Cited

U.S. PATENT DOCUMENTS 4,833,584 A * 5/1989 Divan ......................... 363/37
5,642,273 A * 6/1997 Lai et al. ...................... 363/56
6,219,265 B1 * 4/2001 Bernet et al. ................ 363/137

OTHER PUBLICATIONS

Ruan et al., "Soft–switching techniques for PWM three–level converters" *Power Electronics and Motion Control Conference* 1:417–423, XP002192642. (2000).

Wu T–F et al., "A PDM Controlled Series Resonant Multi–Level Converter Applied for X–Ray Generators" $30^{TH}$ Annual IEEE Power Electronics Specialists Conference. 2:1177–1182 (1999).

IN–HO Song et al., "A Novel three–level ZVS PWM inverter topology for high–voltage DC/DC conversion systems with balanced voltage sharing and wider load range" Industry Application Conference,. pp. 973–979, XP010201414 (1996).

Pinheiro J. R. et al., "Wide load range three–level ZVS–PWM DC–to–DC converter Proceedings of the Annual Power Electronics Specialists Conference"., vol. conf. 24, pp. 171–177, XP010149040 (1993).

* cited by examiner

Primary Examiner—Adolf Denske Berhane
(74) Attorney, Agent, or Firm—Fish & Richardson P.C.

(57) ABSTRACT

A power inverter includes a multi-level switching circuit for switching between any two voltage levels selected from a set of N voltage levels. The switching circuit includes at least N+1 switching elements. Each switching element has a corresponding resonant capacitor connected parallel to it. As the switching elements turn on and off, different ones of the resonant capacitors cooperate with a resonant inductor connected to a pole of the switching circuit and with an output capacitor in maintaining a resonance condition as seen from the active switching elements.

19 Claims, 4 Drawing Sheets

MULTI-LEVEL QUASI-RESONANT POWER INVERTER

RELATED APPLICATIONS

This application is a continuation of copending U.S. application Ser. No. 09/818,235, filed on Mar. 26, 2001, which is a continuation-in-part of copending U.S. application Ser. No. 09/705,158, filed on Nov. 2, 2000.

STATEMENT REGARDING FEDERALLY SPONSORED RESEARCH

The United States Government has rights in this invention pursuant to SBIR contract number F33615-98-C-2822 between the United States Air Force and American Superconductor Corporation.

FIELD OF THE INVENTION

This invention relates to power inverters, and in particular, to power inverters controlled by a pulse-width modulator.

BACKGROUND

A power inverter converts DC to AC by passing a succession of variable amplitude DC pulses through a filter circuit. These DC pulses transport energy stored in a large capacitor, or other DC source, to a filter circuit.

The output of the filter circuit is effectively a moving average of the input pulses. When the duty cycle of the pulse train is low, a low voltage exists at the output because the time-average power carried by the pulse-train is low. Conversely, when the duty cycle is high, a high voltage exists at the output because the time-average power carried by the pulse train is high. By appropriately controlling the duty cycle of the pulse train, it is possible to generate a smoothly varying AC voltage at the output of the inverter.

An inverter of the type described above typically includes one or more switches to generate the pulse train. These switches are most often implemented as transistors or thyristors having a gate driven by a micro-controller. When the switch is in its open state, a high voltage exists across the switch terminals but no current flows, hence the switch consumes no power. When the switch is in its closed state, a large current flows, but across such a negligible voltage drop that for all practical purposes, the transistor switch consumes no power.

As a result of the finite switching times inherent in semiconductor devices, between the open and closed states of the switch there lies a transition interval during which the voltage and the current are both non-negligible. While operating in this transition interval, the transistor switch consumes significant power. This power, integrated over the transition interval is referred to as the "switching loss" per cycle.

One way to reduce switching loss is to reduce the difference between the pre-switching voltage and the post-switching voltage. Intuitively, switching between 10,000 volts and 0 volts can be expected to take longer and to result in a higher switching loss than merely switching between 10,000 volts and 5,000 volts. This is the principle behind a multi-level inverter, in which the difference between the two voltages that the switch is to switch between is adaptively changed based on the desired output voltage of the inverter.

Another way to reduce switching loss is to place a resonant circuit between the switch and the inverter output. The resonant circuit is configured to have a resonant frequency that is much higher than the switching frequency. Changing the state of the switch triggers oscillation in the resonant circuit. Because of this oscillation, the voltage across the switch periodically crosses the zero voltage axis.

If the state of the switch is changed when the voltage across the switch is approximately zero, then the transition interval will occur at a time when the voltage across the switch is essentially zero. Each zero crossing thus provides a window of opportunity for changing the state of the switch without incurring significant switching losses. By having a resonant frequency that is much higher than the switching frequency, one can assure that there will be a nearby zero crossing for the controller to use when the time comes to change the state of the switch. This is the principle of a quasi-resonant inverter.

SUMMARY

The invention reduces switching losses in a multi-level power inverter by placing a resonant capacitor in parallel with each switching element of the switching circuit of the inverter. This resonant capacitor interacts with a resonant inductor connected to a pole of the switching circuit to form a resonant circuit across the switching elements. As switching elements are turned on and off, different resonant capacitors are switched smoothly in and out of the resonant circuit.

A power inverter incorporating the principles of the invention includes a switching circuit for switching between any two voltage levels selected from N voltage levels, where N is an integer greater than or equal to three. The switching circuit includes at least N+1 switching elements and a corresponding plurality of resonant capacitors. Each of the resonant capacitors is connected in parallel with a corresponding one of the switching elements. As the switching elements turn on and off, different ones of the resonant capacitors interact with a resonant inductor connected to a pole of the switching circuit and with an output capacitor. This interaction results in the maintenance of a resonance condition as seen from the active switching elements.

In one aspect of the invention, a tri-level inverter includes a switching circuit with four switching elements, each having a first terminal and a second terminal across which a resonant capacitor is connected. The first terminal of the first switching element is available for connection to a positive DC voltage source. The second switching element has a first terminal that is connected to the second terminal of the first switching element and a second terminal connected to the pole of the switching circuit. The third switching element has a first terminal connected to the pole of the switching circuit and a second terminal connected to the first terminal of the fourth switching element. The second terminal of the fourth switching element is available for connection to a negative DC voltage source.

The resonant capacitors placed across each of the switching elements absorb energy that is normally dissipated in the switching elements. This energy is later sent back to the load. This significantly reduces switching losses in the switching element because the resonant capacitors can absorb the energy that would otherwise be dissipated.

These and other features and advantages of the invention will be apparent from the following detailed description and the accompanying figures, in which:

DETAILED DESCRIPTION

Figure 1:
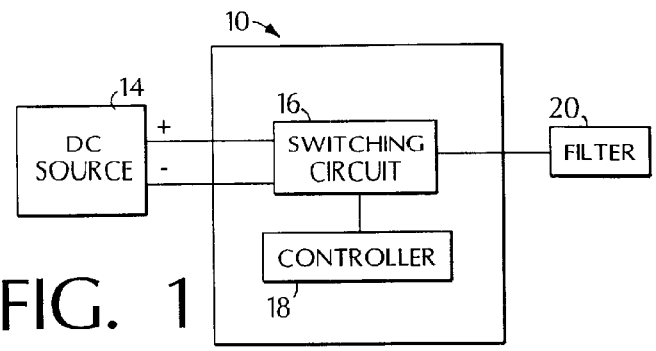
FIG. 1 shows a block diagram of a power inverter.

FIG. 1 shows a multi-level power inverter 10 used to convert DC power to AC power. The illustrated power inverter 10 has an input terminal for connection to an external DC voltage source 14. In low-power applications, an external DC voltage source 14 might be a solar cell, a battery, or a fuel cell. In high-power applications, the external DC voltage source 14 might be a capacitor bank charged by a line-source and tapped for backup power upon failure of the line-source.

Current provided by the DC voltage source 14 is provided to input terminals of a switching circuit 16. In response to control signals provided by a controller 18, the switching circuit 16 switches on and off, thereby periodically tapping the DC voltage source to generate an output pulse train that forms the output of the power inverter 10.

Throughout this specification, "turning off" a switch means preventing current from flowing between its terminals. Conversely, "turning on" a switch means enabling current to flow between its terminals.

The output pulse train is provided to an output filter 20 that smooths the pulse train generated by the switching circuit 16 to form an output sinusoidal waveform having the desired frequency. The energy stored in the output filter 20 is used to cycle the resonant capacitors in the switching circuit 16.

Figure 2:
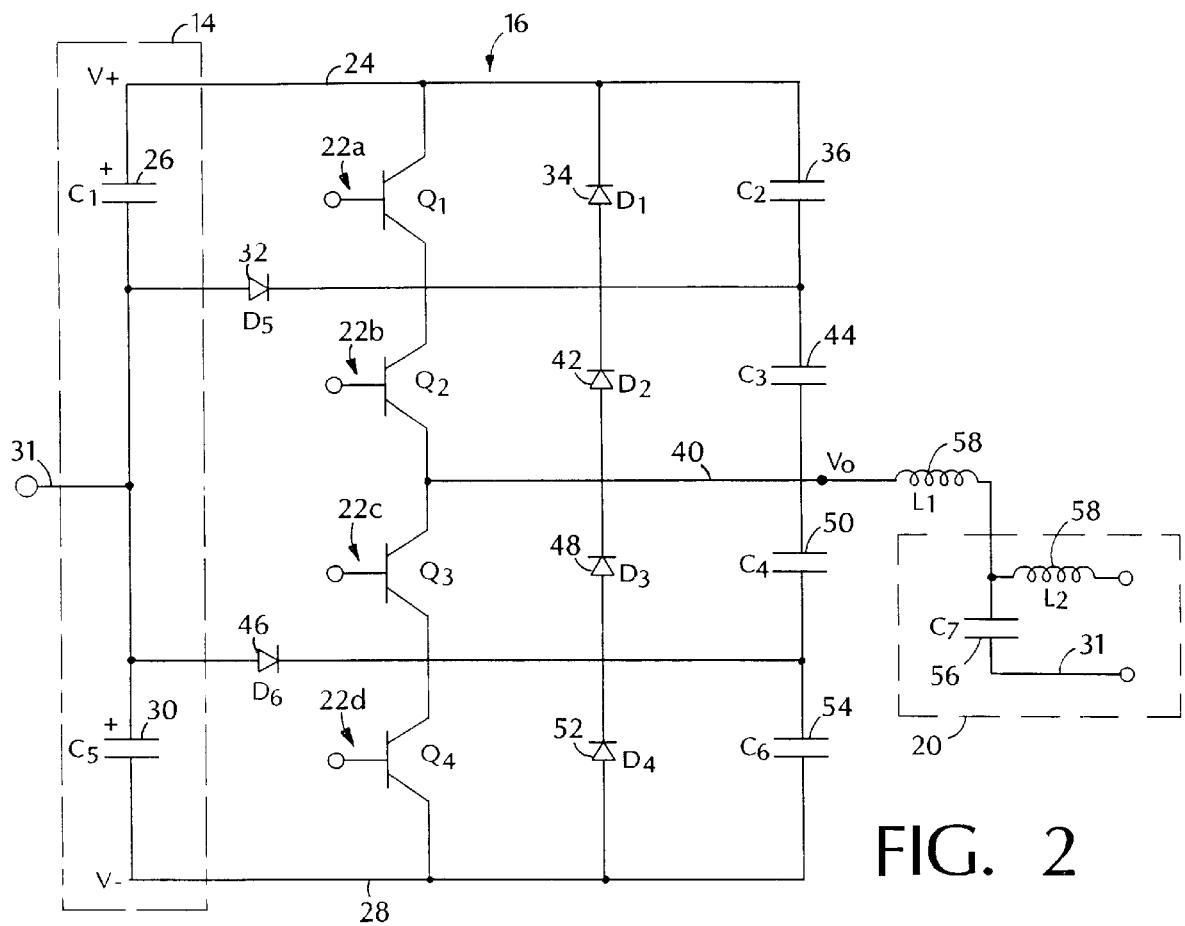
FIG. 2 shows a switching circuit from the power inverter of FIG. 1.

FIG. 2 shows a more detailed view of the switching circuit 16 of FIG. 1. While the switching circuit 16 includes additional components that are not shown, those components would be apparent to one of ordinary skill in the art. For example, the connection between the micro-controller 18 and the switching elements 22a–d is omitted in the interest of clarity. Also omitted are connections that enable the micro-controller 18 to monitor the state of the switching circuit 16. These additional components are described in commonly owned U.S. application Ser. No. 09/704,899, entitled "Integrated Multi-Inverter Assembly," filed on Nov. 2, 2000, the contents of which are herein incorporated by reference.

While the embodiment described above is a multi-level inverter with three voltage levels, it will be apparent that the principles of the invention can readily be extended to other multi-level inverters having an odd number of voltage levels.

The switching action of the switching circuit 16 is achieved by four switching elements 22a–d, each of which is a transistor module made up of insulated gate bipolar transistors (IGBT) and accompanying circuitry. Transistor modules of this type are available from a variety of manufacturers, including Eupec GmBH of Warstein, Germany. However, the invention is also applicable to other types of switching elements or transistor modules.

As shown in FIG. 2, the switching circuit 16 includes a first DC rail 24, which is maintained at a positive potential through a connection with a positive terminal of a first capacitor bank 26, and a second DC rail 28, which is maintained at a negative potential by a connection to a negative terminal of a second capacitor bank 30. A negative terminal of the first capacitor bank and a positive terminal of the second capacitor bank are both clamped to zero voltage by their respective connections to a neutral terminal 31.

The first switching element 22a has a first output terminal connected to the positive DC rail 24 and a second output terminal connected to the negative terminal of the first capacitor bank 26 by way of a first diode 32. The anode terminal of the first diode 32 is oriented so that the forward current flow through the first diode 32 leads away from the negative terminal of the first capacitor bank 26. A second diode 34 has its anode terminal connected to the cathode terminal of the first diode 32 and its cathode terminal connected to the positive DC rail 24. This second diode 34 thus enables forward current flow in the direction of the positive DC rail 24. Where a DC voltage other than a capacitor bank is used, the positive and negative terminals of that DC voltage source can likewise be connected to the positive and negative DC rails 24, 28.

At the output of the switching circuit 16, a resonant inductor 38 has a first terminal connected to a pole 40 of the switching circuit 16 and a second terminal connected to a first terminal of an output capacitor 56. The second terminal of the output capacitor 56 is connected to the neutral terminal 31. The first terminal of the output capacitor 56 is connected to a first terminal of an output inductor 58, the second terminal of which carries the output voltage of the power inverter 10. The output capacitor 56 and the output inductor 58 thus cooperate in the output filter 20 to which the inverter's load is to be connected.

A first resonant capacitor 36 is connected in parallel with the second diode 34. The first resonant capacitor 36, together with the resonant inductor 38 and the output capacitor 56, forms a first resonant circuit. Provided that the current in the resonant inductor 38 is flowing in the proper direction, this first resonant circuit is set resonating whenever the controller 18 turns the first switching element 22a on or off.

The second switching element 22b has a first output terminal connected to the cathode terminal of the first diode 32 and a second output terminal connected to the pole 40. A third diode 42 is connected across the first and second output terminals of the second switching element 22b with its anode terminal connected to the pole 40.

A second resonant capacitor 44 is connected in parallel with the third diode 42. The second resonant capacitor 44, together with the resonant inductor 38 and the output capacitor 56, forms a second resonant circuit. Provided that the current through the output inductor 38 is flowing in the proper direction, this second resonant circuit is set resonating whenever the controller 18 turns the second switching element 22b on or off.

A third switching element 22c has a first output terminal connected to the pole 40 of the switching circuit 16 and its second output terminal connected to the positive terminal of the second capacitor bank 30 by way of a fourth diode 46. The fourth diode 46 is oriented so that forward current flow is toward the positive terminal of the second capacitor bank 30. A fifth diode 48 is connected in parallel with the first and second output terminals of the third switching element 22c and oriented so that the direction of forward current flow through the fifth diode 48 is toward the pole 40.

A third resonant capacitor 50 is connected in parallel with the fifth diode. The third resonant capacitor 50, together with the resonant inductor 38 and the output capacitor 56, forms a third resonant circuit. Provided that the current through the output inductor 38 is flowing in the proper direction, this third resonant circuit is set resonating whenever the controller 18 turns the third switching element 22c on or off.

Finally, the switching circuit 16 includes a fourth switching element 22d having a first output terminal connected to the anode terminal of the fifth diode 48 and a second output terminal connected to the negative DC rail 28. A sixth diode 52 is connected across the first and second output terminals of the fourth switching element 22d and oriented so that the direction of forward current flow through the sixth diode 52 leads away from the negative DC rail 28.

A fourth resonant capacitor 54 is connected in parallel with the sixth diode 52. The fourth resonant capacitor 54, together with the resonant inductor 38 and the output capacitor 56, form a fourth resonant circuit. Provided that the current through the output inductor 38 is flowing in the proper direction, this fourth resonant circuit is set resonating whenever the controller 18 turns the fourth switching element 22d on or off.

The capacitance of the output capacitor 56 is much larger than the capacitances of the four resonant capacitors 36, 44, 50, 54. A typical value for the capacitance of the resonant capacitors is 2 microfarads. A typical value for the capacitance of the output capacitor is 500 microfarads.

The inductance of the resonant inductor 38 is selected to be much smaller than the inductance of the output inductor 58. A typical value for the inductance of the resonant inductor is 500 microhenrys. A typical value for the inductance of the output inductor is 5 millihenrys.

The four resonant capacitors 36, 44, 50, 54, in addition to cooperating with the resonant inductor 38 and with the output capacitor 56 to form a resonant circuit, also function as snubbers across each switching element 22a–d. When a switching element is turned off, the current that was flowing through the switching element does not stop immediately because of parasitic reactances throughout the switching circuit 16. The presence of a resonant capacitor provides a place to divert the current and accumulate charge while the current comes to a stop. This charge will then be available to contribute to the resonant inductor 38 at a later time. Unlike conventional snubbers across a switch, which are typically parallel RC circuits, the resonant capacitor has a purely reactive impedance and therefore does not dissipate heat. This feature of the invention thus further contributes to the reduction of switching losses.

In operation, before the controller 18 turns on a selected switching element, it checks to see that the voltage across the resonant circuit capacitor is approximately equal to zero. The selected switching element thus turns on only when the voltage across the resonant circuit capacitor is approximately equal to zero. The selected switching element turns off only when the voltage in the resonant circuit is approximately equal to zero and the current in the resonant circuit has reached its approximate maximum.

Figure 5:
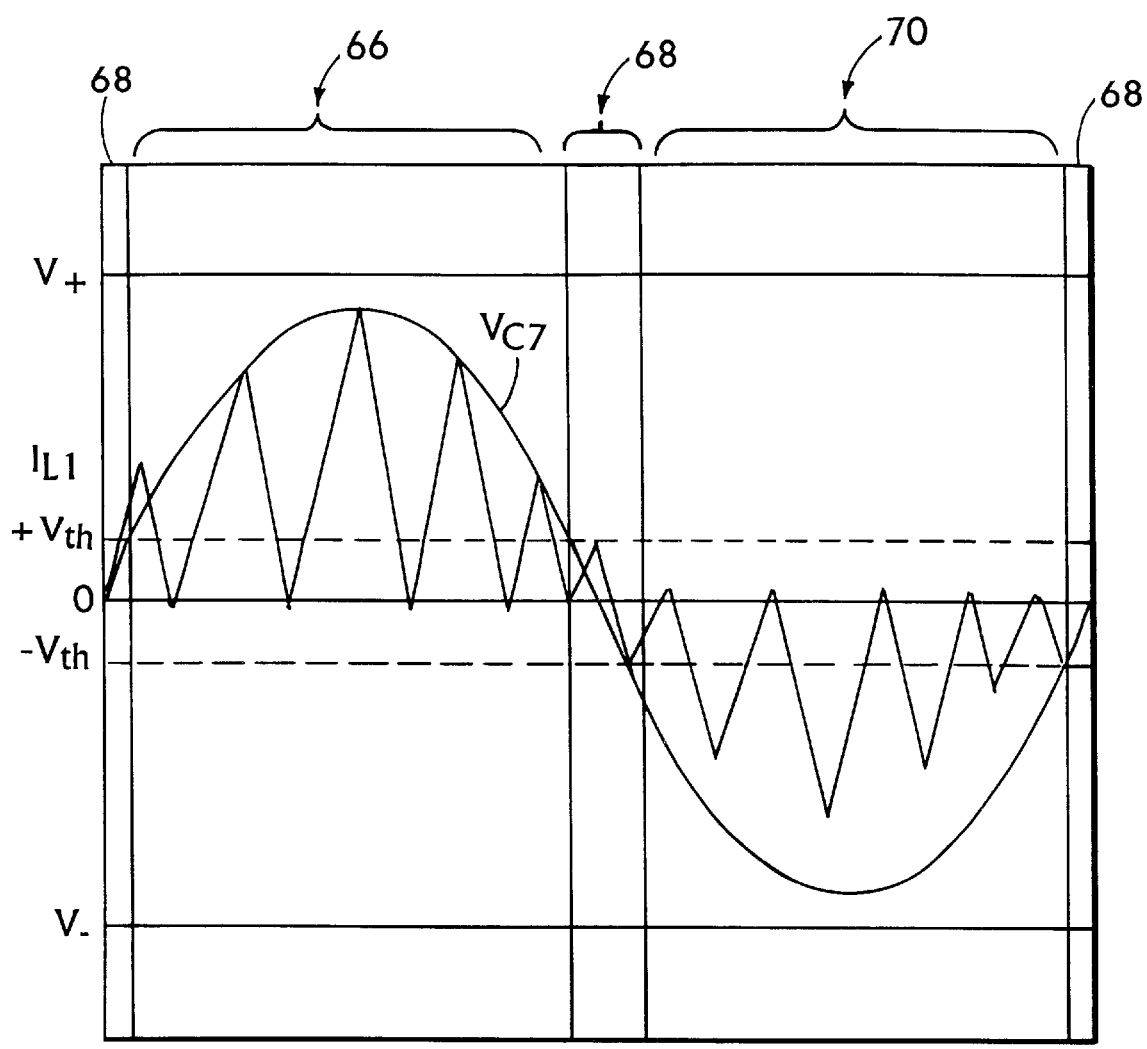
FIG. 5 shows the typical resonant inductor current during one cycle of output voltage for the power inverter of FIG. 1.

The controller 18 selects one of three different timing patterns depending on the magnitude of the voltage at the output of the power inverter 10. FIG. 5 shows a typical output waveform for the power inverter 10, with dashed lines above and below the zero voltage axis representing first and second threshold voltages ($+V_{th}$ and $-V_{th}$) respectively. The solid lines above and below the zero voltage axis show the voltages ($V_+$ and $V_-$) of the DC rails 24, 28. Typically, the DC rail voltages are on the order of 3500 volts above and below the voltage at the neutral terminal 31. The indicated voltage waveform corresponds to the voltage measured across the output capacitor 56.

The vertical lines in FIG. 5 show the boundaries between the three voltage levels that characterize a tri-level inverter. These vertical lines divide the output waveform into three regions: A first region 66 in which the output-waveform voltage is greater than the first threshold voltage, a second region 68 in which the output-waveform voltage is between the first and second threshold voltages, and a third region 70 in which the output-waveform voltage is less than the second threshold voltage.

Unlike operation in the first and third regions 66, 70, operation in the second region 68 requires switching between the voltages at the first and second DC rails 24, 28. As a result, operation in the second region 68 incurs significantly higher switching losses than operation in the first and third regions 66, 70. It is therefore desirable to minimize the operating time in the second region 68 and to spend as much time as possible operating in the first and third regions 66, 70.

As suggested by FIG. 5, the sizes of the first, second, and third regions 66, 66, 70, and hence the time spent operating in those regions, can be controlled by adjusting the threshold voltages. The threshold voltages for a particular application depend to a great extent on the performance characteristics of the switching elements 22a–d. The performance characteristics of currently available switching elements 22a–22b are such that these threshold voltages can be on the order of 10% of the DC rail voltages. For example, given the typical 3500 volt DC rail voltages, the threshold voltages are on the order of 350 volts. To the extent that future switching elements with better performance become available, these threshold voltages can be made progressively lower.

Values of the threshold voltages $+V_{th}$ and $-V_{th}$ are highly application-specific and depend in part on the desired output voltage waveform and on the performance characteristics of the switching elements. These values are selected to ensure that there exists sufficient energy to enable the resonant capacitors to transition between two states of the switching circuit 16.

The switching circuit 16 provides three voltage levels to select from: the voltage at the positive DC rail 24; the voltage at the negative DC rail 28, and a zero voltage at the neutral terminal 31. When operating in the first region 66, the switching circuit switches between a first voltage level (the voltage at the positive DC rail 24) and the third voltage level (the zero voltage at the neutral terminal 31). When operating in the third region 70, the switching circuit 16 switches between the second voltage level (the voltage at the negative DC rail 28) and the third voltage level (the zero voltage at the neutral terminal 31). When operating in the second region 68, the switching circuit 16 switches between the first and second voltage levels. The switching circuit 16 thus switches between any two voltage levels selected from a plurality (in this case a plurality of three) of voltage levels.

A multi-level inverter for switching between more than three voltage levels would have additional thresholds, and hence additional vertical lines defining regions of operation in addition to the three regions described above. Values of these thresholds thresholds are highly application-specific and depend in part on the desired output voltage waveform and on the performance characteristics of the switching elements. These values are selected to ensure that there exists sufficient energy to enable the resonant capacitors to transition between two states of the switching circuit 16.

Figure 3:
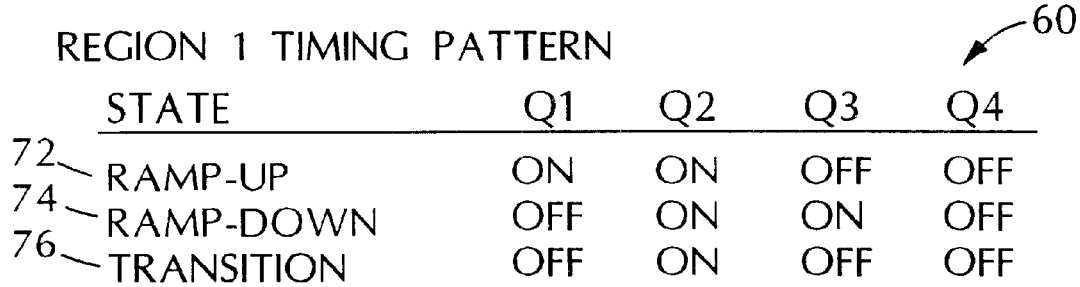
FIG. 3 shows three timing patterns, each of which is a sequence for turning selected switching elements on and off.
Figure 3:
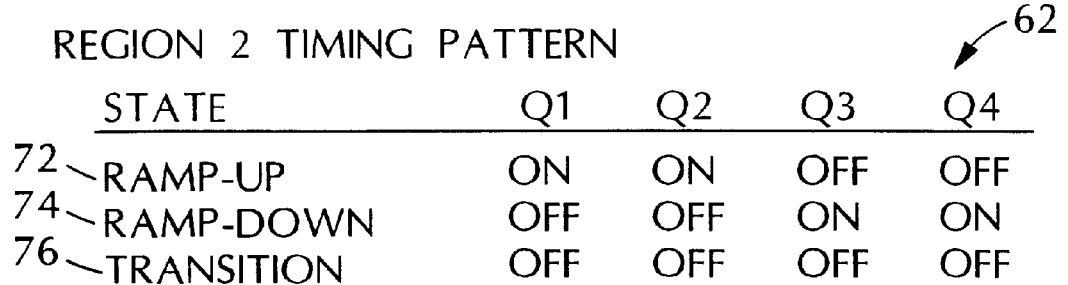
Figure 3:
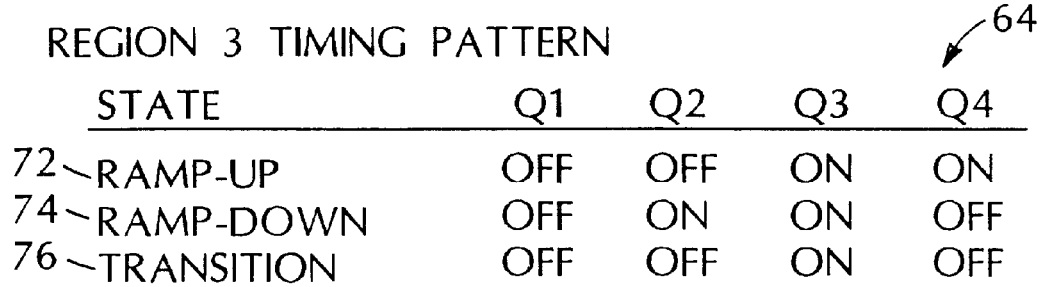

A first timing pattern 60, shown at the top of FIG. 3, is used when the output voltage of the power inverter 10 is greater than the first threshold. A second timing pattern 62, shown in the middle of FIG. 3, is used when the output voltage is between the first and second thresholds. A third timing pattern 64, shown in the bottom of FIG. 3, is the mirror image of the first timing pattern 60. This third timing pattern 64 is used when the output voltage of the power inverter 10 is less than the second threshold.

Each of the three timing patterns 60, 62, 64 is characterized by a combination of one or more switching elements 22a–d being turned on and one or more remaining switching elements 22a–d being turned off. Each of these combinations corresponds to one of the three states within the timing pattern. These three states: are a current ramp-up state 72, a current ramp-down state 74, and a transition state 76 between the ramp-up and the ramp-down states. A pulse cycle is completed when switching circuit 16 has sequentially operated in the ramp-up state 72, followed by the transition state 76, followed by the ramp-down state 74, followed again by the transition state 76.

The controller 18 executes pulse cycles so long as the desired output voltage is consistent with a selected timing pattern. Once the output voltage is outside the voltage range appropriate for the selected timing pattern, the controller 18 selects a new timing pattern and begins executing pulse cycles corresponding to that new timing pattern. The temporal extent of each pulse is such that the average output voltage obtained by integrating the pulses closely approximates the desired output voltage.

Figure 4:
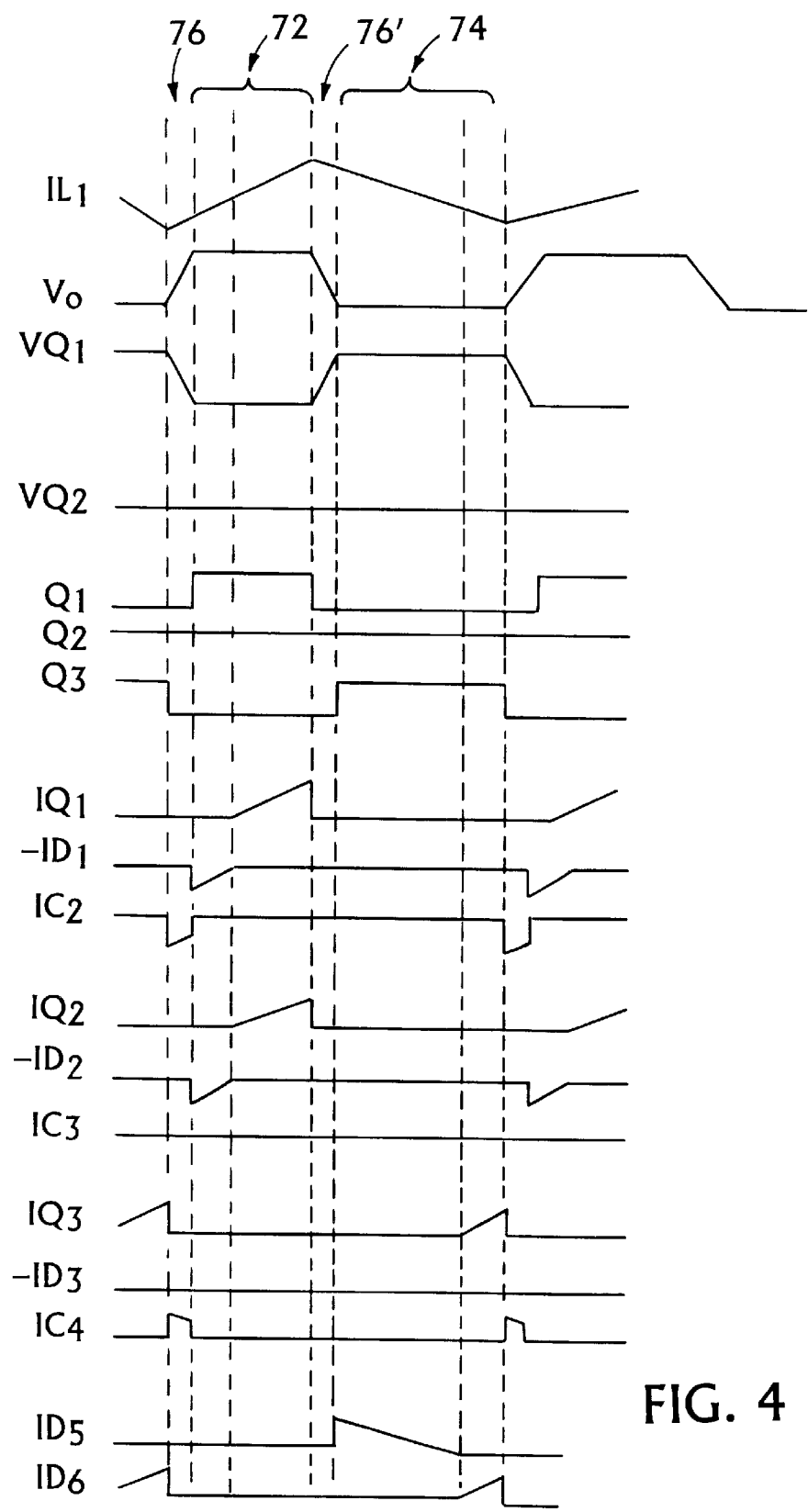
FIG. 4 shows the effect of the first timing pattern of FIG. 3 on currents and voltages at various points in the switching circuit of FIG. 2.

The first timing pattern 60, which is used in generating positive voltages that are above the selected threshold, is shown in detail in FIG. 4. In this first timing pattern 60, the second switching element 22b is always turned on. During the ramp-up state 72, the first switching element 22a is on and the third switching element 22c is off. During the ramp-down state 74, the configuration is just the opposite: the first switching element 22a is off and the third switching element 22c is on. In the transition state 76, both the first and third switching elements 22a, 22c are off. The curve designated as $V_o$ is the voltage measured at the pole 40 of the switching circuit 16.

The remaining combination, in which the first and third switching elements 22a, 22c are both on, is never used since this combination would short the switching circuit 16. The transition period provides a margin of safety by enabling the previously turned-on switching element to be completely off before the previously turned-off switching element is turned on.

Referring again to FIG. 4, during a first transition state 76 that precedes the ramp-up state 72, the first and third switching elements 22a, 22c are both off. As a result, the first and third resonant capacitors 36, 50 begin to discharge. This causes the current $I_{L1}$ in the resonant inductor 38 to begin ramping up.

After a selected transition time has elapsed, the controller 18 turns on the first switching element 22a to place the switching circuit 16 into the ramp-up state 72. During the ramp-up state 72, the first switching element 22a conducts current from the positive DC rail 24 to the resonant inductor 38. This continues the ramping up of the current in the resonant inductor 38. The controller 18 leaves the switching circuit 16 in the ramp-up state 72 for a selected ramp-up interval. The length of the ramp-up interval is selected on the basis of the desired output voltage.

After the selected ramp-up interval has elapsed, the controller 18 turns off the first switching element 22a, thereby beginning a second transition state 76'. During the second transition state 76', the first and third resonant capacitors 36, 50 again begin to discharge. However, in this second transition state 76', the polarities are reversed from what they were in the first transition state 76. Hence, the slope of the current in the cresonant inductor 38 changes sign and begins to ramp down.

After a selected transition time has elapsed, the controller 18 turns on the third switching element 22c, thereby placing the switching circuit 16 into the ramp-down state 74. During the ramp-down state 74, the third switching element 22c conducts current to the resonant inductor 38 but in a direction opposite to that in the ramp-up state 72. As a result, the current in the resonant inductor 38 continues to ramp down.

To generate a voltage in the first region 66, the controller 18 operates the switching circuit 16 according to the first timing pattern 60. To generate a voltage in the second region 68, the controller 18 operates the switching circuit 16 according to the second timing pattern 62. Finally, to generate a voltage in the third region 70, the controller 18 operates the switching circuit 16 according to the third timing pattern 64.

The foregoing pulse cycle is repeated, though with different ramp-up and ramp-down times, for as long as the controller 18 is operating in the first region 66 shown in FIG. 5. Each tooth in the saw-tooth pattern of FIG. 5 corresponds the current flowing through the resonant inductor 38 during the course of one pulse cycle. Note that the current in the resonant inductor 38 crosses the zero current axis once per pulse cycle.

Once the desired output voltage falls below the selected threshold, the controller 18 abandons the first timing pattern 60 and starts to use the second timing pattern 62 associated with the second region 68 in FIG. 5. To enter the ramp-up state 72 of the second timing pattern 62, the controller 18 turns off all the switching elements 22a–d. Then, to enter the ramp-down state 74, the controller 18 turns off the second switching element 22b and turns on the fourth switching element 22d, leaving the third switching element 22c turned on.

Once the desired output voltage becomes more negative than the negative of the selected threshold, the controller 18 abandons the second timing pattern 62 and starts to use the third timing pattern 64 associated with the third region 70 in FIG. 5. The third timing pattern 64 is essentially the mirror image of the first timing pattern 60 and requires no exposition beyond the table shown in FIG. 3.

It will thus be seen that the invention combines the advantages of multi-level inverters with the soft-switching techniques associated with quasi-resonant inverters to reduce switching losses. Unlike conventional power inverters that have dedicated switching control circuitry to initiate resonance, the resonance condition in the power inverter of the invention is self-triggering. Thus, the invention provides a tri-level quasi-resonant inverter having a minimum of additional circuitry.

While the illustrated embodiment is an inverter having three levels, and hence four switching elements, it will be apparent that the configuration shown can readily be extended to other multi-level inverters that have an odd number of voltage levels. Such inverters would have additional switching elements, each of which would be snubbed by a capacitor as shown in FIG. 2.

Having described the invention, and a preferred embodiment thereof, what I claim as new and secured by letters patent is:

1. A power inverter comprising:
a switching circuit for switching between any two voltage levels selected from N voltage levels, where N is an integer greater than or equal to three, said switching circuit including
at least N+1 switching elements connected serially, and
a corresponding plurality of resonant capacitors, each of said resonant capacitors connected in parallel with a corresponding one of said switching elements, each of said resonant capacitors forming a portion of a resonant circuit.

2. The power inverter of claim 1 further comprising a resonant inductor connected to a pole of said switching circuit, said resonant inductor cooperating with a resonant capacitor to form a resonant circuit.

3. The power converter of claim 2 further comprising an output capacitor connected to said resonant inductor.

4. The power inverter of claim 3 further comprising an output filter connected to said resonant inductor and to said output capacitor.

5. The power inverter of claim 1 further comprising a micro-controller in communication with each of said switching elements for controlling a state of each of said switching elements.

6. The power inverter of claim 5 wherein said micro-controller is configured to select a timing pattern on the basis of a desired output voltage level and to control said plurality of switching elements in accord with said timing pattern.

7. The power inverter of claim 6 wherein said micro-controller is configured
to turn on a first subset of said switching elements to place said switching circuit in a ramp-up state for providing an increasing current in a resonant inductor; and
to turn on a second subset of said switching elements to place said switching circuit in a ramp-down state for providing a decreasing current in said resonant inductor.

8. The power inverter of claim 7 wherein said micro-controller is configured to turn on a third subset of said switching elements to provide a transition state between said ramp-up state and said ramp-down state.

9. A power inverter comprising
a switching circuit having a pole, said switching circuit including:
a first switching element having a first terminal and a second terminal;
a first resonant capacitor connected across said first terminal and said second terminal of said first switching element;
a second switching element having a first terminal connected to said second terminal of said first switching element and a second terminal connected to said pole of said switching circuit;
a second resonant capacitor connected across said first terminal and said second terminal of said second switching element;
a third switching element having a first terminal and a second terminal, said first terminal connected to said pole of said switching circuit;
a third resonant capacitor connected across said first terminal and said second terminal of said third switching element;
a fourth switching element having a first terminal and a second terminal, said first terminal connected to said second terminal of said third switching element; and
a fourth resonant capacitor connected across said first terminal and said second terminal of said fourth switching element.

10. The power inverter of claim 9 further comprising a resonant inductor having a first terminal and a second terminal, said first terminal being connected to said pole of said switching circuit, said resonant inductor
cooperating with said first resonant capacitor to establish a first resonant circuit across said first switching element during a first switching interval,
cooperating with said second resonant capacitor to establish a second resonant circuit across said second switching element during a second switching interval,
cooperating with said third resonant capacitor to establish a third resonant circuit across said third switching element during a third switching interval, and
cooperating with said fourth resonant capacitor to establish a fourth resonant circuit across said fourth switching element during a fourth switching interval.

11. The power inverter of claim 10 further comprising an output filter connected to said second terminal of said resonant inductor.

12. The power inverter of claim 9 further comprising a micro-controller in communication with each of said switching elements for controlling a state of each of said switching elements.

13. The power inverter of claim 9 further comprising a DC voltage source connected to said first terminal of said first resonant capacitor.

14. The power inverter of claim 12 wherein said micro-controller is configured to select a timing pattern on the basis of a desired output voltage level and to control said state of said switching elements in accord with said timing pattern.

15. The power inverter of claim 14 wherein said micro-controller is configured
to turn on a first subset of said switching elements to place said switching circuit in a ramp-up state for providing an increasing current in a resonant inductor; and
to turn on a second subset of said switching elements to place said switching circuit in a ramp-down state for providing a decreasing current in said resonant inductor.

16. The power inverter of claim 15 wherein said micro-controller is configured to turn off said switching elements to provide a transition state between said ramp-up state and said ramp-down state.

17. A method for operating a quasi-resonant inverter having a multi-level switching circuit for switching between any two voltage levels selected from N voltage levels, N being an integer greater than or equal to three, said switching circuit including at least N+1 switching elements connected serially and a corresponding plurality of resonant capacitors, each of said resonant capacitors connected in parallel with a corresponding one of said switching elements, said method comprising:

selecting a timing pattern on the basis of a desired output voltage level; and controlling said plurality of switching elements in accord with said timing pattern.

18. The method of claim 17 wherein controlling said plurality of switching elements comprises turning on a first subset of said switching elements to place said switching circuit in a ramp-up state for providing an increasing current in a resonant inductor; and turning on a second subset of said switching elements to place said switching circuit in a ramp-down state for providing a decreasing current in said resonant inductor.

19. The method of claim 18 further comprising turning on a third subset of said switching elements to provide a transition state between said ramp-up state and said ramp-down state.

\* \* \* \* \*